US009344927B2

(12) United States Patent
Johansson et al.

(10) Patent No.: US 9,344,927 B2
(45) Date of Patent: May 17, 2016

(54) CELL SELECTION IN A CELLULAR COMMUNICATION SYSTEM (71) Applicant: Telefonaktiebolaget L M Ericsson (publ), Stockholm (SE)

(72) Inventors: Thomas Johansson, Åby (SE); Håkan Palm, Växjö (SE); Paul Schliwa-Bertling, Ljungsbro (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/938,543

(22) Filed: Jul. 10, 2013

(65) Prior Publication Data
US 2013/0295937 A1 Nov. 7, 2013

Related U.S. Application Data (63) Continuation of application No. 13/035,158, filed on Feb. 25, 2011, now Pat. No. 8,509,797.

(30) Foreign Application Priority Data

Feb. 18, 2011 (WO) ................. PCT/SE2011/050182

(51) Int. Cl.
*H04W 36/00* (2009.01)
*H04W 48/20* (2009.01)
(Continued)

(52) U.S. Cl.
CPC .......... *H04W 36/0055* (2013.01); *H04W 48/20* (2013.01); *H04W 76/046* (2013.01); *H04W 88/06* (2013.01)

(58) Field of Classification Search
CPC . H04W 48/18; H04W 36/30; H04W 36/0083; H04W 24/02; H04W 76/046; H04W 36/0022; H04W 36/0088; H04W 36/0061; H04W 36/08; H04W 36/0094; H04W 36/22; H04W 36/04; H04W 36/00; H04W 74/006
USPC .......................................................... 455/436
See application file for complete search history.

(56) References Cited

U.S. PATENT DOCUMENTS 8,509,797 B2 * 8/2013 Johansson et al. ......... 455/452.1
2007/0110022 A1 * 5/2007 Palenius et al. ............. 370/350
(Continued)

FOREIGN PATENT DOCUMENTS

| EP | 2056639 A2 | 5/2009 |
| EP | 2252107 A2 | 11/2010 |
| WO | 2008156304 A2 | 12/2008 |

*Primary Examiner* — Kwasi Karikari
(74) *Attorney, Agent, or Firm* — Coats & Bennett, PLLC (57) ABSTRACT A method in a user equipment for handling cell selection is provided. While in dedicated mode the user equipment receives from a radio network node a measurement information message which indicates at least two frequencies associated with a respective cell in a respective radio access technology. While it is in dedicated mode, the user equipment performs measurements on the frequencies to obtain a respective measurement value for each one of them, and receives a selection indicator message comprising a respective priority for each one of the frequencies. The user equipment obtains a respective threshold value for each of the frequencies and successively evaluates the frequencies in descending priority order until a frequency is determined for which the measurement value exceeds its respective threshold value. When entering idle mode, the user equipment selects cell based on the evaluation.

14 Claims, 6 Drawing Sheets (51) Int. Cl.
*H04W 76/04* (2009.01)
*H04W 88/06* (2009.01)

(56) References Cited

U.S. PATENT DOCUMENTS

2008/0200169 A1* 8/2008 Gao .............................. 455/434
2010/0022242 A1* 1/2010 Nizri et al. ................. 455/435.2
2010/0081438 A1   4/2010 Callender et al.
2010/0184429 A1* 7/2010 Tod et al. ...................... 455/434
2010/0316034 A1* 12/2010 Burbidge et al. ............. 370/338
2011/0065434 A1   3/2011 Roberts et al.
2011/0250888 A1* 10/2011 Ryu et al. ...................... 455/436

* cited by examiner

Fig. 6 ively using the services of cell reselection.

CELL SELECTION IN A CELLULAR COMMUNICATION SYSTEM

RELATED APPLICATIONS

The present application is a continuation of U.S. patent application Ser. No. 13/035,158, which was filed on Feb. 25, 2011 and claims priority to International Patent Application number PCT/SE2011/050182 filed Feb. 18, 2011, both of which are incorporated herein by reference in their entirety.

TECHNICAL FIELD

Embodiments herein relate to a user equipment and a method in a user equipment. Embodiments herein further relate to a radio network node and a method in a radio network node. In particular, embodiments herein relate to handling cell selection.

BACKGROUND

In a typical cellular communication system, also referred to as a wireless communication system, User Equipments (UEs) communicate via a Radio Access Network (RAN) to one or more core networks (CNs).

A user equipment may be a mobile terminal by which a subscriber can access services offered by an operator's core network.

The user equipments may be mobile stations or user equipment units such as mobile telephones, also known as "cellular" telephones, and laptops with wireless capability, and thus may be, for example, portable, pocket, hand-held, computer-included, or car-mounted mobile devices which communicate voice and/or data with the radio access network.

Each cell in the cellular communication system covers a geographical area. A cell is served by Radio Base Station (RBS) equipment at a radio base station site. That is, the radio base station provides radio coverage in the cell and communicates over an air interface with user equipment units operating on radio frequencies within its range.

A radio base station is in some cellular communication systems also called "eNB", "eNodeB", "NodeB" or "B node", and will in this document be referred to as a Base Station (BS).

The part of the cellular communication system that handles the communications with the user equipments over radio link is referred to the Radio Access Network.

Over the years, several different Radio Access Technologies (RATs) have evolved, such as GSM, WCDMA and LTE.

Depending on the RAT in question, the RAN comprises different radio network nodes, which may be referred to by different names.

In GSM, the radio base stations are referred to as base stations, and are controlled by so called Base Station Controllers (BSCs).

In WCDMA, the base stations are controlled by so called Radio Network Controllers (RNCs).

In LTE, the base stations are referred to as eNodeBs. There is no node in LTE corresponding to the BSC or RNC units of GSM and WCDMA. In LTE, the base stations, eNodeBs, themselves comprise further functionality and are interconnected to provide the required services in the RAN.

The different RATs may all exist in the same geographical area, and hence the user equipment may access the core network through different RATs depending on, for example, which RAT provides the best coverage at a specific moment in time or at a specific location.

To enable coexistence of the RATs, the different RATs have their own cells, or frequencies, that are used for communication with the user equipments.

Cell selection, meaning that the user equipment selects a cell to camp on, enables the user equipment to select another cell than the currently serving cell, for example if another cell in another RAT provides better quality of service or coverage.

At times when the user equipment is not actively using the services provided by the core network, it usually enters a so called "idle mode".

In idle mode the user equipment continuously performs measurements on neighbour cells to enable cell selection using standardized idle mode cell reselection algorithms. As input to the cell reselection algorithm, the user equipment uses system information which is broadcast in each cell for all user equipments which are in idle mode and listening.

While in idle mode, the user equipment may indicate its presence to the network by temporarily leaving idle mode to perform so called area update procedures, either periodically or when the user equipment changes area. An area update may be referred to as a "Location Area" (LA) update, or "Tracking Area" update.

When the user equipment starts using the services of the core network, and for example gets involved in an activity such as a phone call, it leaves idle mode and enters into a so called "dedicated mode".

When a user equipment is in dedicated mode, there are radio links, channels, set up between the user equipment and the RAN to enable the necessary data transfer to provide the requested service. Such channels may be referred to as for example a Traffic Channel (TCH) and a Standalone Dedicated Control Channel (SDCCH).

When the call ends, a so called "channel release" message is signaled from the RAN to the user equipment to release the data transfer channels, whereupon the user equipment re-enters idle mode.

When the user equipment is in dedicated mode, it does not listen to the broadcast system information, and does not perform cell selection.

When a call is released and the user equipment re-enters idle mode, it normally selects the serving cell it had when the call was released, and performs an area update if the area has changed during the call.

After the area update, the user equipment reads the broadcasted system information and, if information about other RATs is provided in the system information, the user equipment may select a cell in another RAT by using the measurements and broadcast system information as input to an idle mode cell reselection algorithm as mentioned above.

A move to another RAT may also be initiated at channel release by the RAN, by including a cell selection indicator in the channel release message for the user equipment, indicating which frequencies/cells the user equipment should select.

In order for the RAN to select a cell or frequency, to include in the channel release message, in the same RAT as would be selected by the user equipment idle mode cell reselection algorithm, the network may need to base the cell selection on user equipment measurements. Such measurements need hence be sent in measurement reports from the user equipment while it is in dedicated mode, to the controlling radio network node in the RAN. Based on the measurements, the RAN may then decide which cell provides the best radio connection for the user equipment, and direct it to a specific cell in a specific RAT.

The cellular communication system may also select RAT for the user equipment based on configuration.

A problem is that, during the actual cell reselection process and until the area registration is completed in the selected RAT, the user equipment cannot be reached from the cellular communication system. The time period during which the user equipment is unreachable due to this is referred to as the "outage time".

SUMMARY

In view of the discussion above, it is an object for embodiments herein to provide an improved way of handling cell selection.

According to a first aspect, the object is achieved by a method in a user equipment for handling cell selection. The user equipment is comprised in a cellular communication system. The user equipment enters dedicated mode. While it is in dedicated mode, the user equipment receives a measurement information message from a radio network node. The measurement information message indicates at least two frequencies. Each of the indicated frequencies is associated with a respective cell in a respective radio access technology. While it is in dedicated mode, the user equipment performs measurements on the indicated frequencies to obtain a respective measurement value for each one of the indicated frequencies. While it is in dedicated mode, the user equipment further receives from the radio network node a selection indicator message comprising a respective priority for each one of the indicated frequencies. While it is in dedicated mode, the user equipment further obtains a respective threshold value for each of the respective indicated frequencies. The user equipment successively evaluates the indicated frequencies in descending priority order until an indicated frequency is determined for which the measurement value exceeds its respective threshold value. When entering idle mode, the user equipment selects, based on the evaluation, the cell with which the determined indicated frequency is associated.

According to a second aspect, the object is achieved by a user equipment for handling cell selection. The user equipment is comprised in a cellular communication system. The user equipment comprises a receiver configured to, while the user equipment is in dedicated mode, receive from a radio network node a measurement information message indicating at least two frequencies. Each of the indicated frequencies is associated with a respective cell in a respective radio access technology. The receiver is further configured to, while the user equipment is in dedicated mode, receive from the radio network node a selection indicator message comprising a respective priority for each one of the indicated frequencies. The user equipment further comprises a measurement unit configured to, while the user equipment is in dedicated mode, perform measurements on the indicated frequencies to obtain a respective measurement value for each one of the indicated frequencies. The user equipment further comprises an obtaining unit configured to, while the user equipment is in dedicated mode, obtain a respective threshold value for each of the respective indicated frequencies. The user equipment also comprises an evaluation unit configured to successively evaluate the indicated frequencies in descending priority order until an indicated frequency is determined for which the measurement value exceeds its respective threshold value. Further, the user equipment comprises a selection unit configured to when the user equipment enters idle mode, select, based on the evaluation, the cell with which the determined indicated frequency is associated.

According to a third aspect the object is achieved by a method in a radio network node for assisting a user equipment in handling cell selection. The radio network node and the user equipment are comprised in a cellular communication system. While the user equipment is in dedicated mode, the radio network node signals to the user equipment a measurement information message indicating at least two frequencies. Each of the indicated frequencies is associated with a respective cell in a respective radio access technology. While the user equipment is in dedicated mode the radio network node further signals to the user equipment a selection indicator message comprising a respective priority for each one of the indicated frequencies.

According to a fourth aspect the object is achieved by a radio network node for assisting a user equipment in handling cell selection. The radio network node and the user equipment are comprised in a cellular communication system. The radio network node comprises a transmitter configured to signal to the user equipment when the user equipment is in dedicated mode, a measurement information message indicating at least two frequencies. Each of the indicated frequencies is associated with a respective cell in a respective radio access technology. The transmitter is further configured to signal to the user equipment while the user equipment is in dedicated mode, a selection indicator message comprising a respective priority for each one of the indicated frequencies.

Thanks to embodiments herein wherein relevant measurements are performed by the user equipment, and wherein threshold values and priorities are obtained by the user equipment while it is still in dedicated mode, it is possible for the user equipment to select a cell which provides good quality of service directly after reentering idle mode. Hence, the outage time may be reduced.

Moreover, since the user equipment does not need to report measurements of other RATs to the radio network nodes to enable evaluation and cell selection by the radio communication system, signaling load may also be reduced thanks to embodiments herein.

In addition, embodiments herein may provide a choice of more than one RAT to select directly after a call release.

Other objects, advantages and novel features of embodiments herein will become apparent from the following detailed description when considered in conjunction with the accompanying drawings and claims.

DETAILED DESCRIPTION

Embodiments may be exemplified in the following non-limiting description of embodiments.

Figure 1:
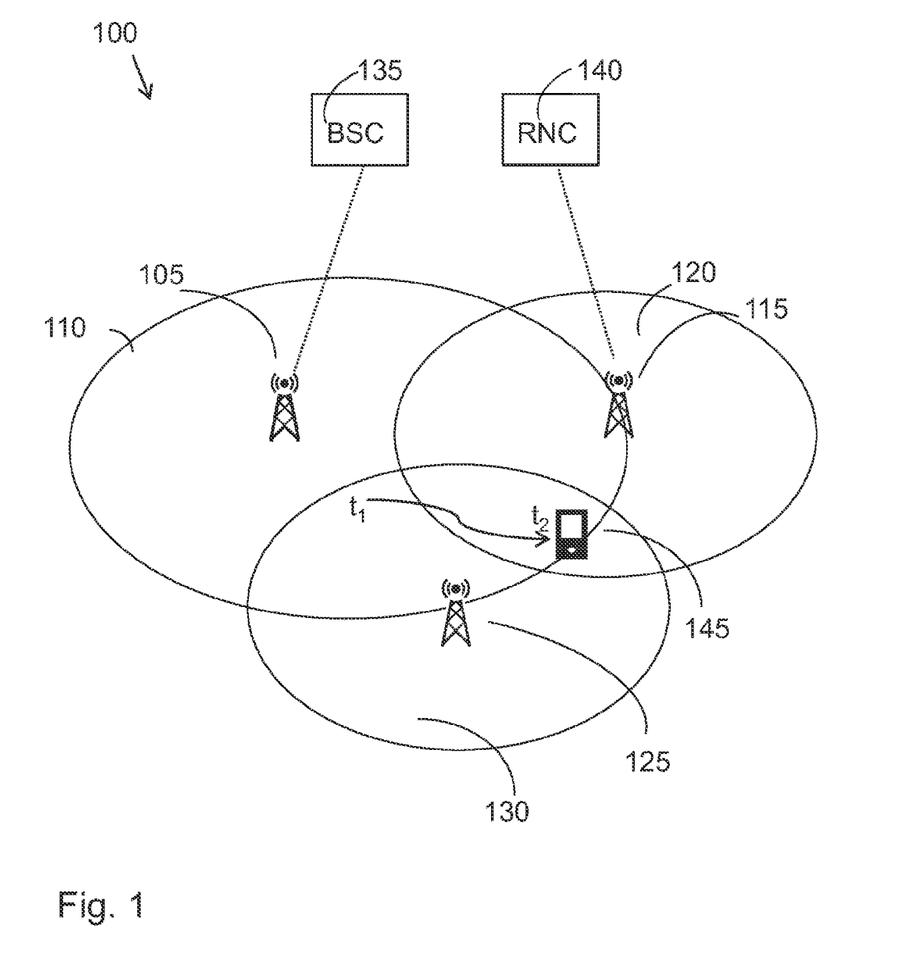
FIG. 1 is a schematic block diagram illustrating an embodiment of a cellular communication system.

FIG. 1 depicts a cellular communication system 100 in which embodiments herein may be implemented.

The cellular communication system 100 comprises a first base station 105 serving a first cell 110, a second base station 115 serving a second cell 120, and a third base station 125, serving a third cell 130.

The first cell 110, second cell 120, and third cell 130 may belong to different Radio Access Technologies (RATs). In this example, the first cell 110 belongs to a GSM-type RAT, the second cell 120 belongs to a WCDMA-type RAT, and the third cell 130 belongs to an LTE-type RAT.

The first base station 105 is controlled by a radio network node 135, which in this example is a BSC. The second base station 115 is controlled by a radio network node 140, which in this example is a RNC. The third base station 125 is in this example an eNodeB, and is therefore, as previously mentioned, not controlled by another radio network node in its RAN.

The radio communication system 100 further comprises a user equipment 145, which in this example is a mobile phone.

In the example illustrated in FIG. 1, the situation is the following: The user equipment 145 enters dedicated mode at a first point in time t1, at which time the user equipment 145 is situated at a location corresponding to the beginning of arrow 146. The reason for the user equipment 145 entering dedicated mode may be for example that the user equipment 145 gets involved in a phone call.

While in dedicated mode, that is while the phone call is on-going in this example, the user equipment 145 moves along a path corresponding to the arrow 146.

At a second point in time t2, the phone call ends, and the user equipment 145 re-enters idle mode.

At the first point in time t1, that is when it enters dedicated mode as described above, the user equipment 145 is served by the first cell 110 belonging to the GSM-type RAT.

According to embodiments herein, the user equipment 145 receives, while it in dedicated mode, from its serving base station, or from its controlling radio network node BSC 135, a measurement information message. The measurement information message indicates at least two frequencies. Each of the indicated frequencies is associated with a respective cell in a respective radio access technology.

In some embodiments, one or more of the indicated frequencies is associated with more than one cell in the radio access technology.

In this example, the measurement information message indicates a first frequency corresponding to the first cell 110, which as previously mentioned is a GSM-type cell. The measurement information message further indicates a second frequency, corresponding to the second cell 120 which, as also previously mentioned, is a WCDMA-type cell. In this example, the measurement information message also indicates a third frequency, corresponding to the third cell 130 which is an LTE-type cell.

In other embodiments, more than one cell or frequencies for the same RAT may be indicated.

While the user equipment 145 is still in dedicated mode, it performs measurements on the indicated frequencies to obtain a respective measurement value for each one of the indicated frequencies.

Hence, in this example the user equipment 145 performs measurements on the first, second, and third indicated frequencies. The user equipment then obtains corresponding first, second and third measurement values.

Also while in dedicated mode, the user equipment 145 receives from the radio network node 135, a selection indicator message, comprising a respective priority for each one of the indicated frequencies.

The user equipment also obtains, still while in dedicated mode, a respective threshold value for each of the respective indicated frequencies.

The threshold values may be obtained from the radio network node 135, or from a memory unit in the user equipment itself, or from another radio network node.

To decide which cell to select, the user equipment 145 successively evaluates the indicated frequencies in descending priority order, until an indicated frequency is determined for which the measurement value exceeds its respective threshold value.

If sufficient information to perform the evaluation is obtained while the user equipment 145 is still in dedicated mode, the user equipment 145 may in some embodiments perform the evaluation while it is in dedicated mode. This may be the case for example if the selection indicator message is received in relation to the measurement information message which is received while the user equipment 145 is in dedicated mode.

If the selection indicator message with the priority information and/or the threshold values are received in a channel release message on the other hand, the evaluation may be performed when the user equipment re-enters idle mode, since the channel release message is related to the re-entry of the user equipment 145 to idle mode.

Based on the evaluation, the user equipment 145 may then when it enters idle mode, at time t2 in this example, select the cell with which the determined indicated frequency is associated.

In the example illustrated in FIG. 1, the third cell 130, which is of LTE-type, has the highest priority. The second cell 120, which is of WCDMA-type has the second highest priority, and the GSM-type first cell 110 has the lowest priority.

Hence, in this example, the user equipment 145 will at the evaluation first evaluate if the third measurement value, corresponding to the indicated frequency for the LTE-type cell, exceeds its respective threshold value.

In this example the third measurement value does not exceed it respective threshold value.

Therefore, the user equipment 145 will move on to evaluating the second measurement value, which corresponds to the second cell 120 which has the second highest priority, and which in this example is a WCDMA-type cell.

In this example the second measurement value does exceed its respective threshold value. The user equipment 145 may hence not have to evaluate the third radio measurement value, corresponding to the GSM-type cell, which in this example has the lowest priority.

Hence, when the user equipment 145 enters idle mode, it selects the second cell 120.

The described example may effectively reduce the outage time compared to known methods where a user equipment first selects the current serving cell, that is the first cell 110 which is of GSM-type in this example, reads system information in the that cell, and then reselects the second cell 130 which in this example is of WCDMA-type.

Moreover, compared to a case when the network may have redirected the user equipment to another RAT, the user equipment 145 does not need to send any measurement reports to the network for cell selection purposes.

To support mobility of user equipments between cells in the cellular communication system, so called handovers must be performed. Handovers are necessary for example when a user equipment, such as a mobile telephone, leaves one cell and moves into another cell. Otherwise, for example an ongoing call would be dropped, due to loss of radio coverage.

A handover may be a change of serving cell, so that a user equipment being served by one cell, becomes served by another, so called candidate cell, instead.

A handover may also mean addition of a radio link to a candidate cell without removing established radio links to other cells; or replacement of one of the existing radio links by a radio link to a candidate cell. Communication that involves a multitude of cells may be referred to as macro diversity, soft handover, softer handover or coordinated multipoint, etc.

It is naturally possible that the user equipment 145 illustrated in FIG. 1 while it is in dedicated mode moves so far away from the cell 110 which was serving it when it entered dedicated mode, that one or more handovers to other so called candidate cells take place during the phone call.

It is worth noting that in such situations, the measurement information message and the selection indicator message may be provided by other radio network nodes that are related to the candidate cells to which the user equipment is handed over.

In some embodiments, the user equipment signals to the radio network node an indication that it is capable of handling cell selection in dedicated mode.

In case of handovers as described above, such an indication may be forwarded to a radio network node related to the candidate cell to which the user equipment is handed over.

In some embodiments more than one cell may be associated with one or more of the indicated frequencies.

A measurement for each of the cells may then be performed, to obtain a respective measurement value for each of the cells associated with the frequency.

Then, the evaluation may comprise comparing all the measurement values for that frequency to the threshold value, to further evaluate if any of the measurement values exceed the threshold value, and also if so, which one of the cells is the best choice for cell selection.

Embodiments herein, relating to methods for handling cell selection will now further be described with reference to the combined signalling scheme and flowchart depicted in FIG. 2, which illustrates the signalling in the example described above in relation to FIG. 1. The signalling illustrated in FIG. 2 takes place between the first point in time t1 and the second point in time t2 illustrated in FIG. 1.

Figure 2:
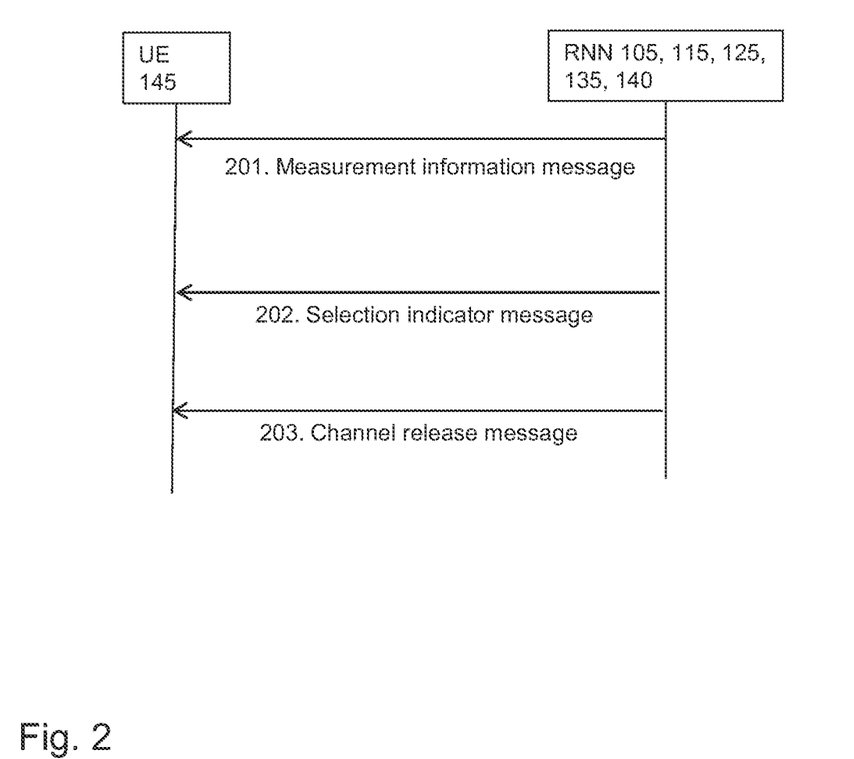
FIG. 2 is a combined signalling scheme and flowchart illustrating signalling in a cellular communication system.

That is, the signalling in FIG. 2 takes place when the user equipment 145 is in dedicated mode.

The signalling in this example is the following:
Action 201

The radio network node 135 signals to the user equipment 145 a measurement information message. The measurement information message indicates at least two, and in this example three, frequencies. Each of the indicated frequencies is associated with a respective cell in a respective radio access technology.
Action 202

The radio network node 135 signals to the user equipment 145 a selection indicator message. The selection indicator message comprises a respective priority for each one of the indicated frequencies.

In some embodiments, the selection indicator message further comprises a respective threshold value for each of the respective indicated frequencies.
Action 203

The radio network node 135 signals a channel release message. It is upon receiving this message that the user equipment 145 re-enters idle mode.

Figure 3:
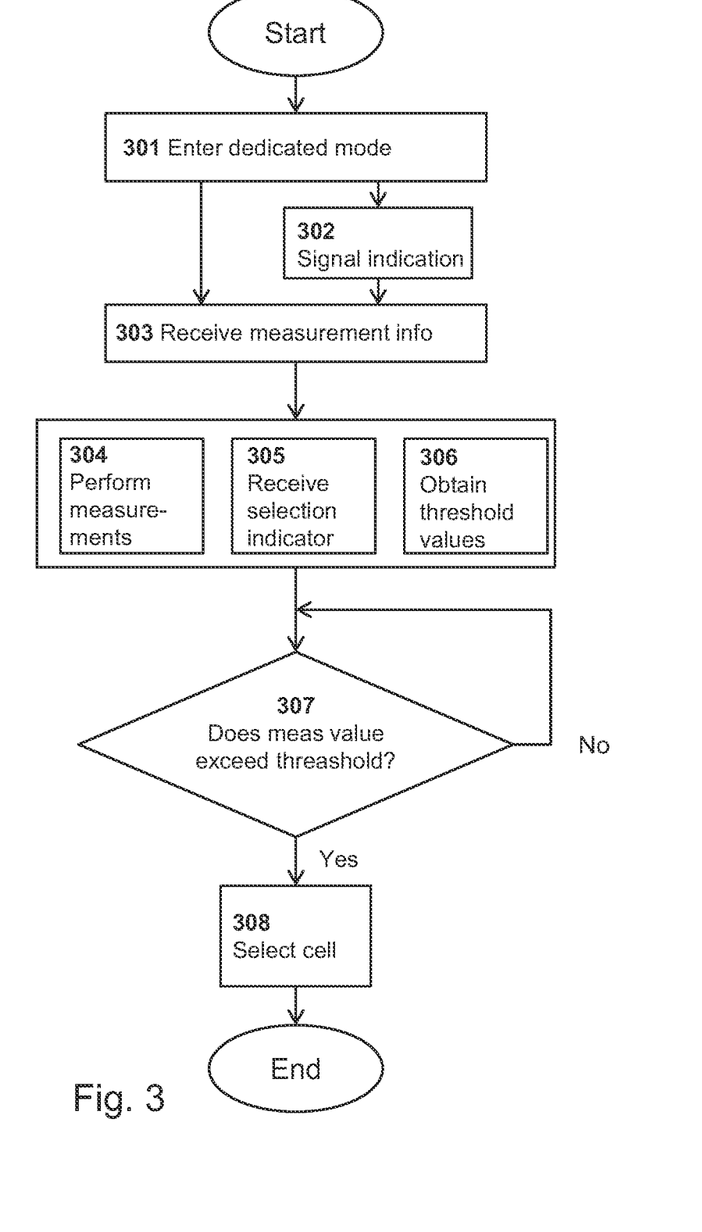
FIG. 3 is a flowchart depicting embodiments of a method in a user equipment.

Embodiments herein, relating to a method in the user equipment 145 for handling cell selection, will now be described with reference to the flowchart depicted in FIG. 3. As previously mentioned, the user equipment 145 is comprised in a cellular communication system 100. The method comprises the following actions, which actions may be taken in any suitable order:
Action 301

The user equipment 145 enters dedicated mode.
Action 302

This is an optional action, according to which the user equipment 145 may signal to a radio network node 105, 115, 125, 135, 140 an indication that the user equipment 145 supports handling of cell selection in dedicated mode, that is, that is capable of cell selection as described above in relation to FIG. 1. The radio network node may be the first base station 105, the second base station 115, the third base station 125, the BSC 135, the RNC 140, or any other suitable radio network node.

This may reduce the signalling, since the radio network node 105, 115, 125, 135, 140 gets the information that the user equipment 145 may itself select a cell when it re-enters idle mode. Thanks to this information, the radio network node 105, 115, 125, 135, 140 does not have to request reporting of radio measurements that it would have needed if it was to perform the cell selection for the user equipment 145.
Action 303

While in dedicated mode, the user equipment 145 receives from the radio network node 105, 115, 125, 135, 140 a measurement information message indicating at least two frequencies. Each of the indicated frequencies is associated with a respective cell 110, 120, 130 in a respective radio access technology.

The radio access technologies may for example be GSM, WCDMA, or LTE.

In some embodiments, one or more of the indicated frequencies is associated with one or more cells in the radio access technology associated with that frequency.
Action 304

While in dedicated mode, the user equipment 145 performs measurements on the indicated frequencies to obtain a respective measurement value for each one of the indicated frequencies.

In embodiments where one or more indicated frequencies are associated with more than one cell, as mentioned above, measurements may be performed to receive a measurement value for each of the cells on the same frequency.

The measured quality may be for example signal strength or/and signal quality of the cell.
Action 305

While still in dedicated mode, the user equipment 145 receives from the radio network node 105, 115, 125, 135, 140 a selection indicator message comprising a respective priority for each one of the indicated frequencies.

In some embodiments, the selection indicator message may be received in the measurement information message.

In some embodiments, the selection indicator message may be received in a channel release message.
Action 306

While in dedicated mode, the user equipment 145 obtains a respective threshold value for each of the respective indicated frequencies.

In some embodiments, the respective threshold values are obtained in the selection indicator message.
Action 307

The user equipment 145 successively evaluates the indicated frequencies in descending priority order until an indicated frequency is determined for which the measurement value exceeds its respective threshold value.

In some embodiments the evaluation is performed while the user equipment 145 is in dedicated mode. This may for example be the case if sufficient information to do the evaluation has been obtained by the user equipment 145 while the user equipment 145 is in dedicated mode, for example if the selection indicator message is comprised in the measurement information message, as mentioned above.

In some embodiments evaluation is performed when the user equipment 145 enters idle mode. This may for example be the case if the selection indicator message is comprised in the channel release message, as mentioned above.

In some embodiments, if more than one cell is associated with one or more indicated frequency, and measurement values are obtained for one or more of the cells associated with the same indicated frequency, then the evaluation may comprise comparing the measurement values of each such cell with the threshold value. If the evaluation shows that more than one of the cells for the same frequency exceeds the threshold value, than the cell which provides the best quality or signal strength may be chosen.

Action 308

When entering idle mode, the user equipment 145 selects based on the evaluation 306 the cell 110, 120, 130 with which the determined indicated frequency is associated.

As mentioned above, if more than one cell is associated with an indicated frequency, the cell which provides the best quality or signal strength may be chosen.

Figure 4:
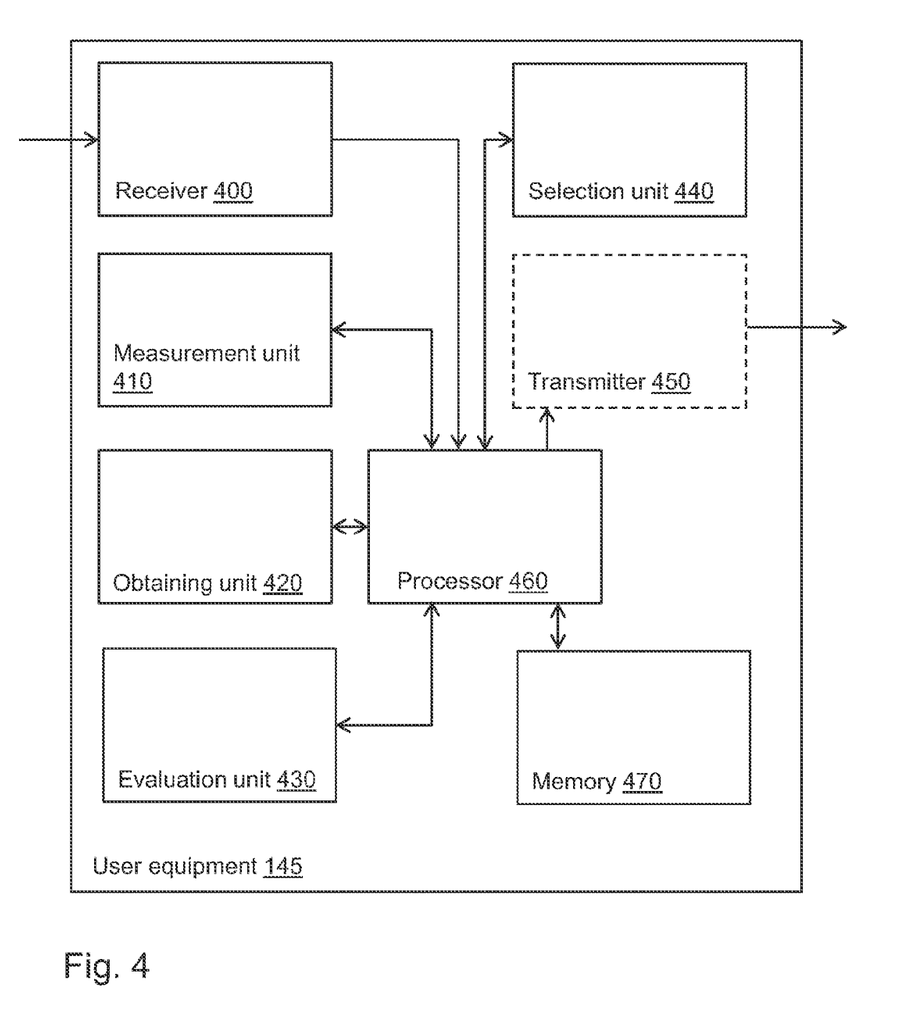
FIG. 4 is a schematic block diagram illustrating embodiments of a user equipment.

To perform the actions above for handling cell selection, the user equipment 145 comprises an arrangement schematically depicted in FIG. 4. As mentioned above, the user equipment 145 is comprised in a cellular communication system 100. The term "configured to" used herein may also be referred to as "arranged to".

The user equipment comprises a receiver 400 configured to, while the user equipment 145 is in dedicated mode, receive from the radio network node 105, 115, 125, 135, 140 a measurement information message indicating at least two frequencies. Each of the indicated frequencies is associated with a respective cell 110, 120, 130 in a respective radio access technology. In further, receive from the radio network node 105, 115, 125, 135, 140 a selection indicator message comprising a respective priority for each one of the indicated frequencies.

In some embodiments the receiver 400 is further configured to receive the selection indicator message in the measurement information message.

In some embodiments the receiver 400 is further configured to receive the selection indicator message in a channel release message.

The user equipment 145 further comprises a measurement unit 410 configured to while the user equipment 145 is in dedicated mode, perform measurements on the indicated frequencies to obtain a respective measurement value for each one of the indicated frequencies.

The user equipment further comprises an obtaining unit 420 configured to obtain while the user equipment is in dedicated mode, a respective threshold value for each of the respective indicated frequencies.

In some embodiments, the receiver 400 is the obtaining unit 410, for example if the respective threshold values are obtained by being received in relation to the selection indicator message.

The user equipment 145 further comprises an evaluation unit 430 configured to successively evaluate the indicated frequencies in descending priority order until an indicated frequency is determined for which the measurement value exceeds its respective threshold value.

In some embodiments the evaluation unit 430 is further configured to perform the evaluation while the user equipment 145 is in dedicated mode.

In some embodiments the evaluation unit 430 is further configured to perform the evaluation when the user equipment 145 enters idle mode.

The user equipment further comprises a selection unit 440 configured to, when the user equipment 145 enters idle mode, select based on the evaluation, the cell 110, 120, 130 with which the determined indicated frequency is associated.

In some embodiments, the user equipment 145 further comprises a transmitter 450 configured to signal to the radio network node 105, 115, 125, 135, 140 an indication that the user equipment 145 supports handling of cell selection in dedicated mode.

Figure 6:
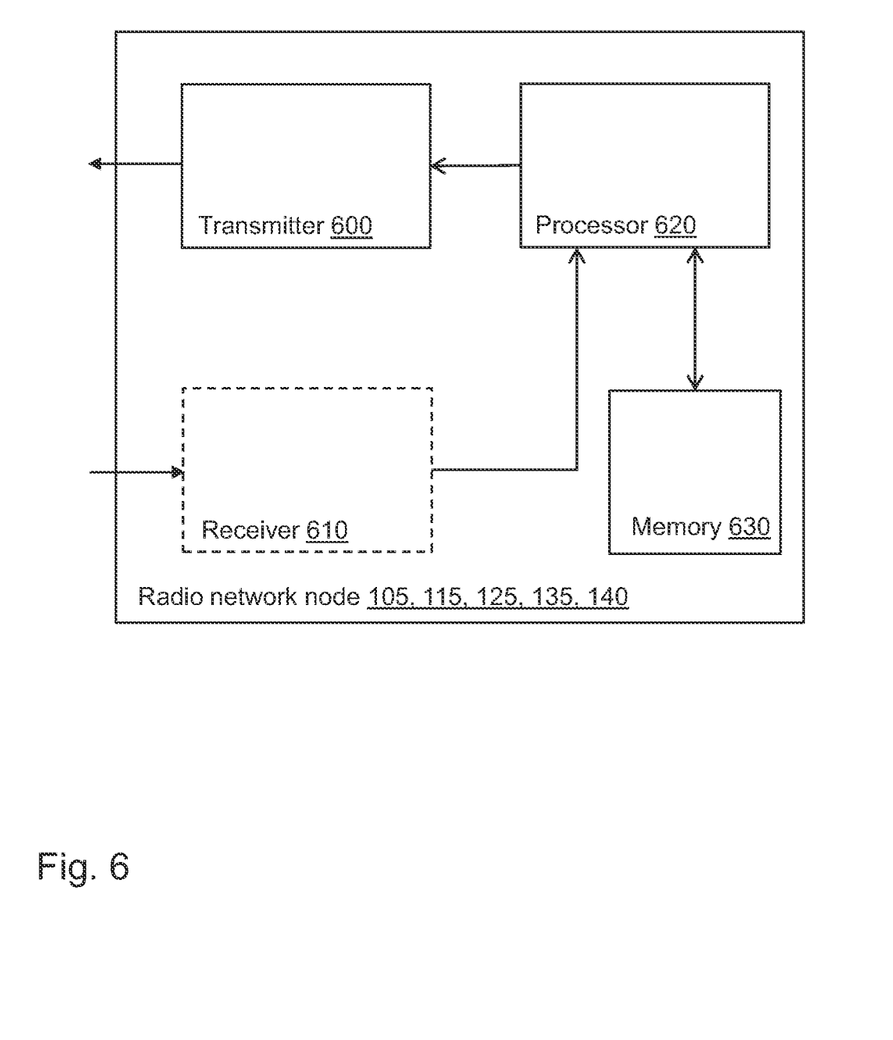
FIG. 6 is a schematic block diagram illustrating embodiments of a radio network node.

The embodiments of the user equipment 145 for handling cell selection may be implemented through one or more processors, such as a processor 460 in the user equipment 145 depicted in FIG. 6, together with computer program code for performing the actions of embodiments herein.

The program code mentioned above may also be provided as a computer program product, for instance in the form of a data carrier carrying computer program code for performing the embodiments herein when being loaded into the user equipment 145.

One such carrier may be in the form of a CD ROM disc. It is however feasible with other data carriers such as a memory stick. The computer program code may furthermore be provided as pure program code on a server and downloaded to the user equipment 145, e.g. remotely.

The user equipment 145 may further comprise a memory 470 comprising one or more memory units. The memory 470 is arranged to be used to store data such as for example the indicated frequencies, the measurement values, the priorities and the threshold values. It may further be arranged to store applications to perform the actions of the embodiments herein when being executed in the user equipment 145.

Figure 5:
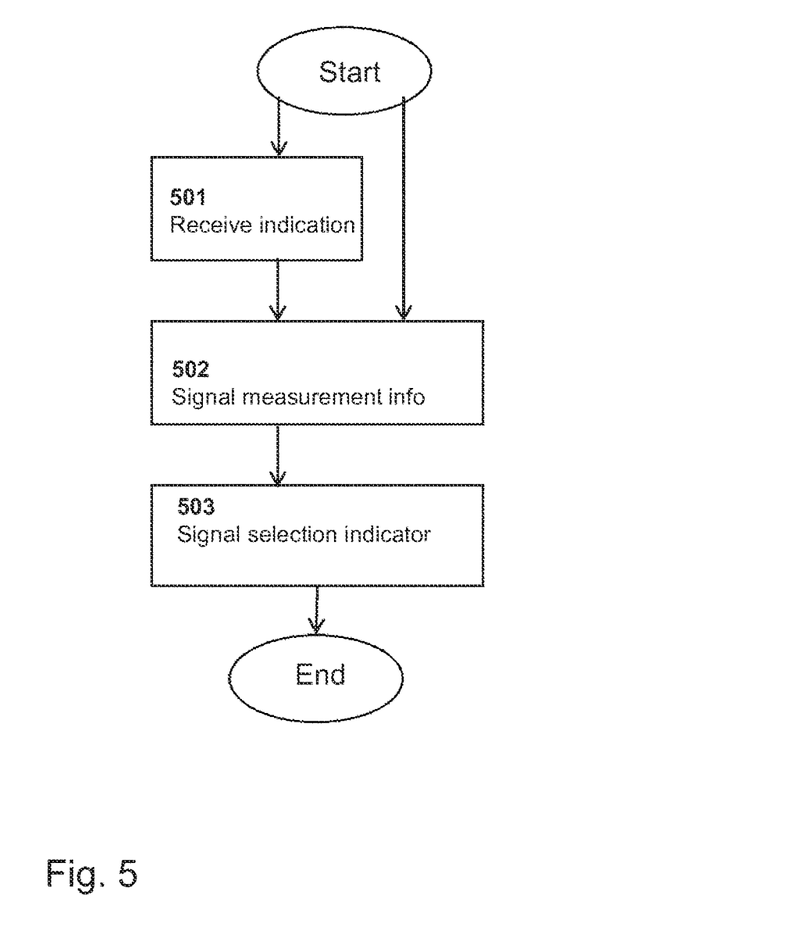
FIG. 5 is a flowchart depicting embodiments of a method in a radio network node.

Embodiments herein, relating to a method in a radio network node 105, 115, 125, 135, 140, for assisting a user equipment 145 in handling cell selection in a cellular communication system 100 will now be described with reference to the flowchart depicted in FIG. 5. As previously mentioned, the user equipment 145 and the radio network node 105, 115, 125, 135, 140 are comprised in cellular communication system 100. The radio network node may be the first base station 105, the second base station 115, the third base station 125, the BSC 130, the RNC 140, or any other suitable radio network node.

The method comprises the following actions, which actions may be taken in any suitable order:

Action 501

This is an optional action according to which the radio network node 105, 115, 125, 135, 140 may receive from the user equipment 145 an indication that the user equipment 145 supports handling of cell selection in dedicated mode.

In some embodiments, such an indication may be forwarded by the radio network node 105, 115, 125, 135, 140 to another radio network node 105, 115, 125, 135, 140 to which the user equipment is handed over while the user equipment 145 is in dedicated mode.

Action 502

The radio network node 105, 115, 125, 135, 140 signals, to the user equipment 145 while the user equipment 145 is in dedicated mode, a measurement information message indicating at least two frequencies. Each of the indicated frequencies is associated with a respective cell 110, 120, 130 in a respective radio access technology.

Action 503

The radio network node 105, 115, 125, 135, 140 signals to the user equipment 145 while the user equipment 145 is in dedicated mode, a selection indicator message comprising a respective priority for each one of the indicated frequencies.

In some embodiments, the selection indicator message further comprises a respective threshold for each one of the indicated frequencies.

In some embodiments, the selection indicator message is signalled in the measurement information message or in a channel release message.

To perform the actions above for assisting a user equipment 145 in handling cell selection, the radio network node 105, 115, 125, 135, 140 comprises an arrangement schematically depicted in FIG. 6. As mentioned above, the radio network node 105, 115, 125, 135, 140 and the user equipment 145 is comprised in a cellular communication system 100. The term "configured to" used herein may also be referred to as "arranged to".

The radio network node 105, 115, 125, 135, 140 comprises a transmitter 600 configured to signal to the user equipment 145 while the user equipment is in dedicated mode, a measurement information message indicating at least two frequencies, each of which indicated frequencies is associated with a respective cell 110, 120, 130 in a respective radio access technology.

The transmitter 600 is further configured signal to the user equipment 145 while the user equipment 145 is in dedicated mode, a selection indicator message comprising a respective priority for each one of the indicated frequencies.

In some embodiments the selection indicator message further comprises a respective threshold for each one of the indicated frequencies.

In some embodiments, the transmitter 600 is further configured to signal the selection indicator message in the measurement information message or in a channel release message.

In some embodiments, the radio network node further comprises a receiver 610 configured to receive from the user equipment 145 an indication that the user equipment 145 supports handling of cell selection in dedicated mode.

In some embodiments, such an indication may be forwarded by the radio network node 105, 115, 125, 135, 140 to another radio network node 105, 115, 125, 135, 140, to which the user equipment is handed over while the user equipment 145 is in dedicated mode.

The embodiments of the radio network node 105, 115, 125, 135, 140 for assisting a user equipment in handling cell selection may be implemented through one or more processors, such as a processor 620 in the radio network node 105, 115, 125, 135, 140 depicted in FIG. 6, together with computer program code for performing the actions of embodiments herein.

The program code mentioned above may also be provided as a computer program product, for instance in the form of a data carrier carrying computer program code for performing the embodiments herein when being loaded into the radio network node 105, 115, 125, 135, 140.

One such carrier may be in the form of a CD ROM disc. It is however feasible with other data carriers such as a memory stick. The computer program code may furthermore be provided as pure program code on a server and downloaded to the radio network node 105, 115, 125, 135, 140, e.g. remotely.

The radio network node 105, 115, 125, 135, 140 may further comprise a memory 630 comprising one or more memory units. The memory 630 may be arranged to be used to store data such as for example the indicated frequencies, the priorities and/or the threshold values. It may further be arranged to store applications to perform the actions of the embodiments herein when being executed in the radio network node 105, 115, 125, 135, 140.

According to embodiments herein, outage time may be reduced, and the need for user equipments to send measurement reports to enable cell selection may be eliminated.

The embodiments are not limited to the above-described embodiments. Various alternatives, modifications and equivalents may be used.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a radio network node for assisting a user equipment in handling idle mode cell selection, the radio network node and the user equipment comprised in a cellular communication system, the method comprising:

while the user equipment is in dedicated mode for circuit-switched services, signaling to the user equipment a measurement information message indicating different frequencies on which the user equipment is to perform measurements for idle mode cell selection, wherein the different frequencies are associated with cells respectively implementing different radio access technologies (RATs); and while the user equipment is in dedicated mode for circuit-switched services, signaling to the user equipment a selection indicator message indicating respective priorities for the different frequencies so as to indicate a priority order in which the user equipment is to successively evaluate the different frequencies for performing inter-RAT cell selection in idle mode.

2. The method according to claim 1, wherein the selection indicator message further comprises a respective threshold for each one of the indicated frequencies.

3. The method according to claim 1, wherein the selection indicator message is signaled in the measurement information message or in a channel release message.

4. The method according to claim 1, further comprising receiving from the user equipment an indication that the user equipment supports handling of cell selection in dedicated mode.

5. The method of claim 1, wherein said dedicated mode for circuit-switched services is GSM dedicated mode, wherein the radio network node is a GSM radio network node, wherein in GSM dedicated mode the user equipment is allocated a GSM Traffic Channel (TCH) or a GSM Standalone Dedicated Control Channel (SDCCH), and wherein said measurement information message is a GSM Measurement Information message.

6. The method of claim 1, wherein the selection indicator message indicates three or more different priorities for three or more different frequencies associated with three or more different radio access technologies.

7. The method of claim 1, wherein the radio network node is a base station, a base station controller, or a radio network controller.

8. A radio network node for assisting a user equipment in handling idle mode cell selection, the radio network node and the user equipment comprised in a cellular communication system, the radio network node comprising a transmitter configured to signal to the user equipment, while the user equipment is in dedicated mode for circuit-switched services:
- a measurement information message indicating different frequencies on which the user equipment is to perform measurements for idle mode cell selection, wherein the different frequencies are associated with cells respectively implementing different radio access technologies; and
- a selection indicator message indicating respective priorities for the different frequencies so as to effectively indicate a priority order in which the user equipment is to successively evaluate the different frequencies for idle mode cell selection.

9. The radio network node according to claim 8, wherein the selection indicator message further comprises a respective threshold for each one of the indicated frequencies.

10. The radio network node according to claim 8, wherein transmitter is further configured to signal the selection indicator message in the measurement information message or in a channel release message.

11. The radio network node according to claim 8, further comprising a receiver configured to receive from the user equipment an indication that the user equipment supports handling of cell selection in dedicated mode.

12. The radio network node of claim 8, wherein said dedicated mode for circuit-switched services is GSM dedicated mode, wherein the radio network node is a GSM radio network node, wherein in GSM dedicated mode the user equipment is allocated a GSM Traffic Channel (TCH) or a GSM Standalone Dedicated Control Channel (SDCCH), and wherein said measurement information message is a GSM Measurement Information message.

13. The radio network node of claim 8, wherein the selection indicator message indicates three or more different priorities for three or more different frequencies associated with three or more different radio access technologies.

14. The radio network node of claim 8, wherein the radio network node is a base station, a base station controller, or a radio network controller.

* * * * *